United States Patent
Hsu

(10) Patent No.: US 8,510,460 B2
(45) Date of Patent: Aug. 13, 2013

(54) REDUCED VIDEO PLAYER START-UP LATENCY IN HTTP LIVE STREAMING AND SIMILAR PROTOCOLS

(75) Inventor: James Kong Hsu, Redwood City, CA (US)

(73) Assignee: CBS Interactive Inc., San Francisco, CA (US)

( * ) Notice: Subject to any disclaimer, the term of this patent is extended or adjusted under 35 U.S.C. 154(b) by 123 days.

(21) Appl. No.: 13/098,286

(22) Filed: Apr. 29, 2011

(65) Prior Publication Data

US 2012/0278497 A1    Nov. 1, 2012

(51) Int. Cl.
*G06F 15/16* (2006.01)
(52) U.S. Cl.
USPC .......................................... 709/231; 709/236
(58) Field of Classification Search
USPC ................................................. 709/231, 236
See application file for complete search history.

(56) References Cited

U.S. PATENT DOCUMENTS

2012/0047542 A1* 2/2012 Lewis et al. ...................... 725/97
2012/0246462 A1* 9/2012 Moroney et al. .............. 713/151

* cited by examiner

*Primary Examiner* — Kristie Shingles
(74) *Attorney, Agent, or Firm* — Fenwick & West LLP

(57) ABSTRACT

Technology for processing an ordered sequence of frames of a media program intended for play in an HTTP Live Streaming (HLS) player. Processing a first ordered subset of frames of the sequence. Processing a second ordered subset of frames of the sequence separate from the first subset. The second subset following on the first forms a third ordered subset of frames of the media program. Processing the second subset includes creating a manifest file of the subset. The playing time of processed frames of the first subset is at least equal to the processing time of the second subset. Processing the first subset can include creating a manifest file of the subset. The media program can include ads (at least a pre-roll ad) and content. The first ordered subset can be the pre-roll ad. The second ordered subset can be the content and remaining ads (e.g., mid-roll and post roll).

15 Claims, 7 Drawing Sheets

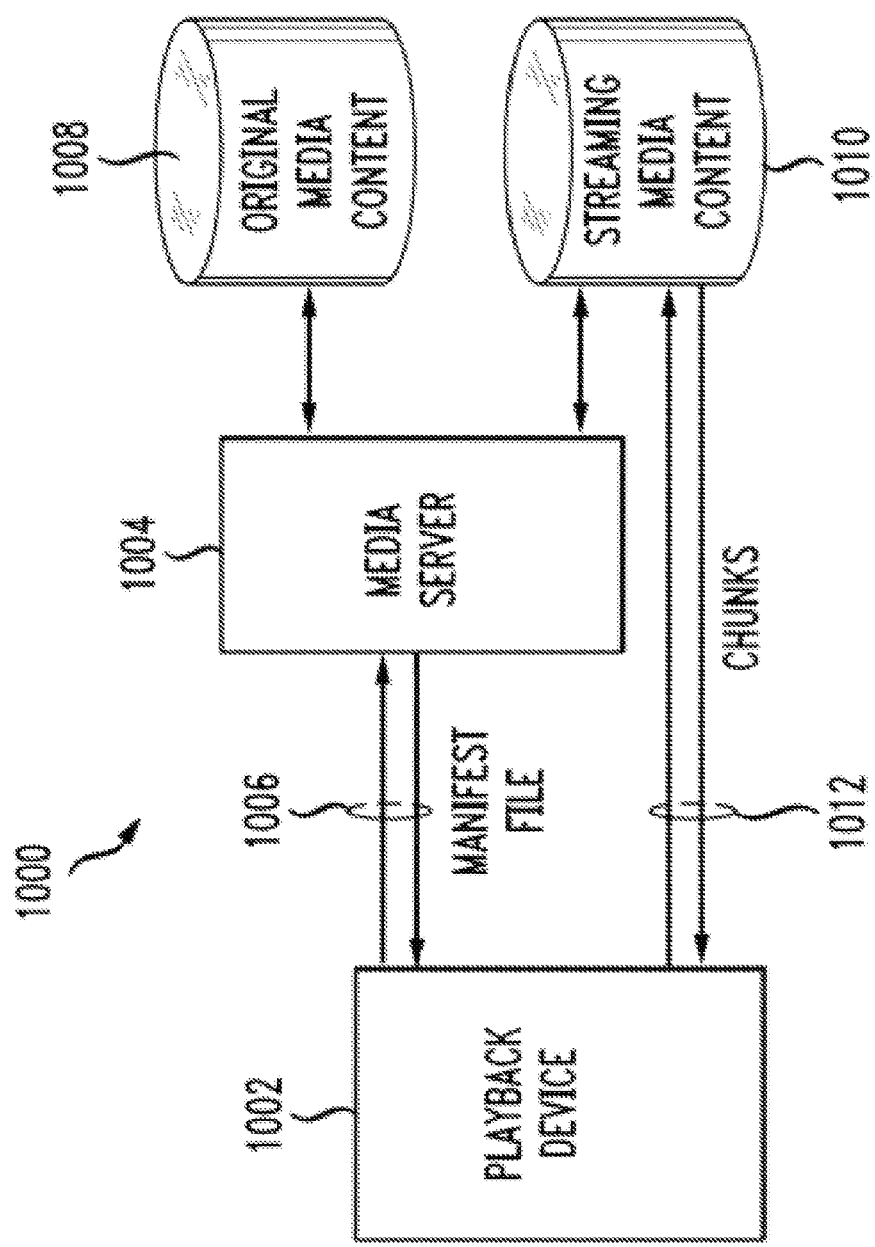

REDUCED VIDEO PLAYER START-UP LATENCY IN HTTP LIVE STREAMING AND SIMILAR PROTOCOLS

FIELD OF THE TECHNOLOGY

The technology disclosed herein relates to on-line audio media and audiovisual media, hereinafter "on-line media." In exemplary embodiments, the technology relates to decreasing the time from a play request to playing of streaming media transported under HTTP Live Streaming (HLS) and similar protocols.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure, and are not therefore to be considered to be limiting of its scope, the principles herein are described and explained with additional specificity and detail through the use of the accompanying drawings in which:

FIG. 1B illustrates an example media streaming system implementation;

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Figure 1A:
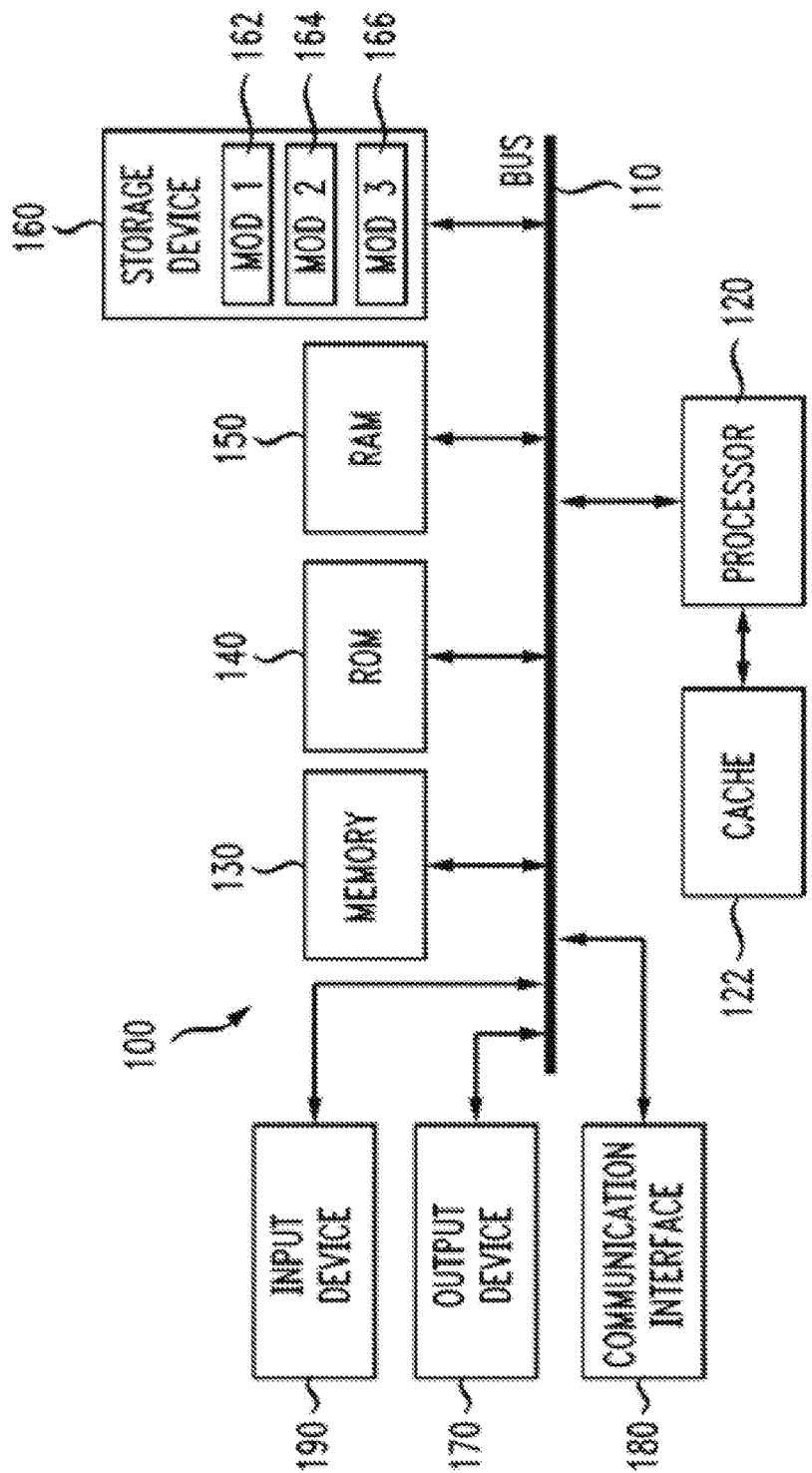
FIG. 1A illustrates an example system implementation.

With reference to FIG. 1A, an exemplary system 100 includes a general-purpose computing device 100, including a processing unit (CPU or processor) 120 and a system bus 110 that couples various system components including the system memory 130 such as read-only memory (ROM) 140 and random-access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general-purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160, such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although some implementations employ the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement, and therefore, the basic features here may easily be substituted for improved hardware or firmware arrangements as they are developed.

For clarity of explanation, the illustrative system embodiment is presented as including individual functional blocks, including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as equivalent to software executing on a general-purpose processor. For example the functions of one or more processors presented in FIG. 1A may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry, in combination with a general purpose DSP circuit, may also be provided.

The logical operations of the various embodiments are implemented as: (1) a sequence of computer implemented steps, operations, or procedures (generally "instructions") running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1A can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1A illustrates three modules Mod1 162, Mod2 164 and Mod3 166 which are modules configured to control the processor 120. These modules may be stored on the storage device 160 and loaded into RAM 150 or memory 130 at runtime, or may be stored as would be known in the art in other computer-readable memory locations.

Content delivery describes the delivery of media "content" such as audio or video or computer software and games over a delivery medium such as broadcasting or the Internet. Content delivery has two parts: delivery of finished content for digital distribution, with its accompanying metadata; and delivery of the end product to the end-user.

Streaming media is media that is received by and presented to an end-user while being delivered by a streaming provider. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming will be referred to as "media" and "streaming." The verb 'to stream' is also derived from this term, meaning to deliver media in this manner. Internet television is a commonly streamed medium.

HTTP Live Streaming (also known as HLS) is an HTTP-based streaming media communications protocol implemented by Apple Inc. as part of their QuickTime X and iPhone software systems. HLS works by breaking the overall media stream into a sequence of small HTTP-based file downloads, each download loading one short "chunk" of an overall potentially unbounded transport stream. As the stream is played, the client (e.g., the media player) may select from a number of different alternate streams containing the same material encoded at a variety of data rates, allowing the streaming session to adapt to the available data rate. At the start of the streaming session, the player downloads/receives a manifest containing the metadata for the various substreams which are available. Since its requests use only standard HTTP transactions, HTTP Live Streaming is capable of traversing a firewall or proxy server that lets through standard HTTP traffic, unlike UDP-based protocols such as RTP. This also allows a content delivery network (CDN) to readily be implemented for any given stream.

Media distribution via the Internet is a source of problems for many reasons, including video encoding formats, bandwidth, playback device capabilities, different screen sizes and resolutions, and so forth. Some manufacturers provide a set of guidelines for media distributors as a standard or generally accepted way to stream media to that manufacturer's devices, such as a standard chunk size for streaming media. Certain video playback devices, such as the Apple IPAD, prefer video content to be streamed not continuously, but as a series of discrete "chunks" of video outlined in a manifest file, such as an m3u8 file, e.g., HLS. The IPAD receives the manifest file that contains links to each of the chunks of video content, and processes the manifest file to retrieve and play back each chunk in turn. However, the m3u8 format imposes several limitations, including the inability to embed other manifest files. This inability to embed other manifest files in the m3u8 format is a hurdle to delivering advertisements and other dynamic interstitial content in streaming video to such devices. In this disclosure, HLS represents the range of protocols that chunk content and employ a playlist/manifest file to manage playback.

Having disclosed some components of a computing system, the disclosure now turns to FIG. 1B, which illustrates an example media streaming system embodiment 1000. The communications between the entities depicted in FIG. 1B can occur via one or more wired or wireless networks. Further, the devices can communicate directly, via the World Wide Web, or via an application programming interface (API). A playback device 1002, such as a tablet device, smartphone, desktop or portable computer, set-top box, Internet-enabled television, media center PC, or any other suitable device, first makes a request to a media server 1004 for playback of media content, such as an episode of Star Trek. Typically, the media server 1004 resides in a network, such as the Internet, for example a third-party content distribution network such as Akami or Limelight.

In HLS, the media server 1004 receives the request and generates or fetches a manifest file 1006 to send to the playback device 1002 in response to the request. Example formats for the manifest file 1006 include the m3u and m3u8 formats. An m3u8 file is a specific variation of an m3u encoded using UTF-8 Unicode characters. The m3u file format was initially used in the WINAMP Media Player for only audio files, but has since become a de facto playlist standard on many media devices for local and/or streaming media, including music and other media types. Many media devices employ variations of the m3u file format, any of which can be used according to the principles set forth herein. A manifest file can include links to media files as relative or absolute paths to a location on a local file system, or as a network address, such as a Uniform Resource Identifier (URI) path. The m3u8 format is used herein as a non-limiting example to illustrate the principles of manifest files including non-standard variants.

The manifest file 1006 includes a list of pointers to sequential chunks of the requested media content. The contents of an example m3u8 manifest file for a 32-second video asset is provided below:

```
#EXTM3U
#EXT-X-MEDIA-SEQUENCE:0
#EXT-X-TARGETDURATION:10
#EXTINF:10,
http://streaming.exampleurl.com/chunk1.ts
#EXTINF:10,
http://streaming.exampleurl.com/chunk2.ts
#EXTINF:10,
http://streaming.exampleurl.com/chunk3.ts
#EXTINF:2,
http://streaming.exampleurl.com/chunk4.ts
#EXT-X-ENDLIST
```

Before or at the time of the request, the media server 1004 generates or identifies the chunks of the requested media content as streaming media content 1010. The chunks of the streaming media content 1010 are generated, either by the media server 1004, the content producer, or some other entity, by splitting the original media content 1008. Upon receiving the manifest file 1006, the playback device 1002 can fetch a first chunk for playback from the streaming media content 1010, and, during playback of that chunk, fetch a next chunk for playback after the first chunk, and so on until the end of the media content. The functionality of the entities depicted in FIG. 1B can be split or merged across entities. For example, an first ingestion server can ingest the original media content 1008 to produce the streaming media content 1010, while a second customer-facing server can service requests for manifest files, and a third media streaming server streams the actual chunks indicated by the links in the manifest file.

Figure 2:
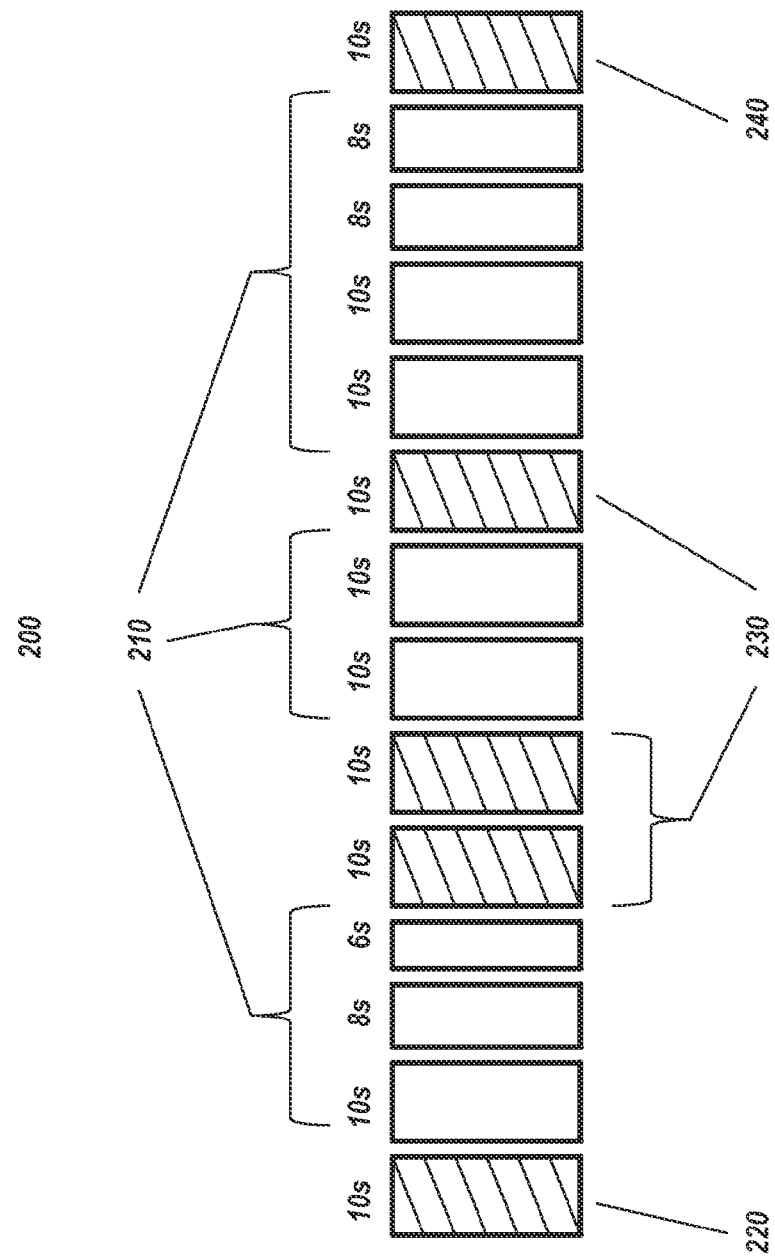
FIG. 2 illustrates a typical HLS media program.

The term "video advertising" is generally accepted to refer to advertising that occurs on Internet television. It is served before, during and after a video stream on the internet. The typical types of advertising units used are pre-roll, mid-roll and post-roll, with these ad units/pods like the traditional spot advertising seen on television, although often they are shorter than their TV counterparts if they are run online. FIG. 2 illustrates an HLS-formatted media program 200 of content chunks 210, a pre-roll ad chunk 220, mid-roll ad chunks 230, and post-roll ad chunks 240. An example manifest file generated by technology for segmenting content files and ad files for compatibility with HLS is provided below:

```
#EXTM3U
#EXT-X-MEDIA-SEQUENCE:0
#EXT-X-TARGETDURATION:10
#AD-BEGIN
#EXTINF:10,
http://streaming.adserver0.com/chunk1.ts
#AD-END
#EXTINF:10,
http://streaming.contentserver.com/chapter1__chunk1.ts
#EXTINF:8,
http://streaming.contentserver.com/chapter1__chunk2.ts
#EXTINF:6,
http://streaming.contentserver.com/chapter1__chunk3.ts
#AD-BEGIN
#EXTINF:10,
http://streaming.adserver1.com/chunk1.ts
#EXTINF:10,
http://streaming.adserver1.com/chunk2.ts
#AD-END
#EXTINF:10,
```

-continued

```
http://streaming.contentserver.com/chapter2__chunk1.ts
#EXTINF:10,
http://streaming.contentserver.com/chapter2__chunk2.ts
#AD-BEGIN
#EXTINF:10,
http://streaming.adserver2.com/chunk1.ts
#AD-END
#EXTINF:10,
http://streaming.contentserver.com/chapter3__chunk1.ts
#EXTINF:10,
http://streaming.contentserver.com/chapter3__chunk2.ts
#EXTINF:8,
http://streaming.contentserver.com/chapter3__chunk3.ts
#EXTINF:8,
http://streaming.contentserver.com/chapter3__chunk4.ts
#AD-BEGIN
#EXTINF:10,
http://streaming.adserver3.com/chunk1.ts
#EXT-X-ENDLIST
```

As this example illustrates, while a standard manifest file is unable to contain other manifest files, the manifest file can contain links to chunks from multiple sources. For instance, the manifest file can include links to chunks on a single-content server and one or more different advertising servers. Alternatively, the manifest file can include links to chunks on a single server that stores both content and advertising. The content chunks, for example, can be stored at different locations, although in a common scenario, a content producer stores all the content chunks on a single server or cluster of servers. When the playback device receives the manifest file, the playback device fetches a first chunk and begins playing that chunk. As that chunk is playing, the playback device fetches the next chunk, and so on.

In some situations, it is advantageous for the content provider to determine the ads to deliver with the content upon request of the content. For example, when ads are selected based on characteristics of the end user. As described above, the ads to accompany content may not come from the same URL as the content. Further, there are many end user devices that employ HLS for playing video content, e.g., the IPAD. There is much content not in HLS format, e.g., content formatted for Adobe Flash. Longer content not in HLS format is preferably formatted in HLS format before playing at an HLS end user device. In some situations, it is advantageous for the content provider to format the content for delivery only upon a play request from the end user device. For example, in streaming a live event.

Figure 3:
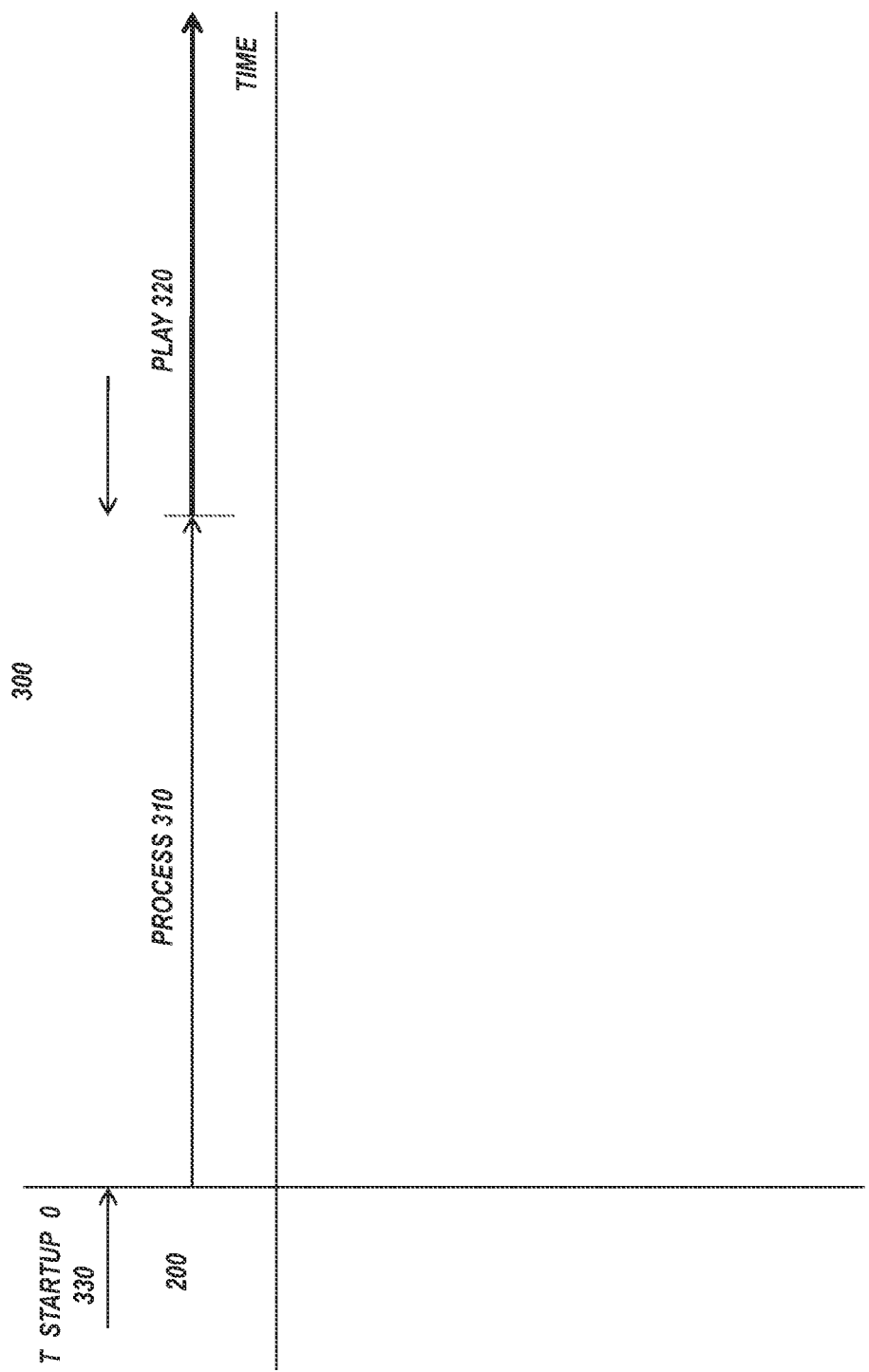
FIG. 3 illustrates a notional timeline for a typical HLS stream.

For such non-HLS content to be delivered to an HLS player with ads determined at the time of the request to play the content, it takes time to: retrieve ads and content, format the ads and content into HLS chunks, and create and deliver a manifest file for the combined content and ads. For example retrieving a single ad identifier from Google's DoubleClick system can take more than 500 milliseconds (or half a second). When ad-supported content and the ads associated with that content are retrieved, formatted, and specified by a single HLS-compliant manifest, the video player can not start until it receives the manifest. This can increase the start-up time of the video player to a point where it becomes unacceptable for the viewer. Potential loss of viewers can occur. Note that some content and some ads may already be in HLS format. However, joining both content and ads into a media program covered by a manifest still requires time, e.g., to retrieve ad-supported content and the supporting ads, and to create the manifest joining them. FIG. 3 is a notional timeline 300 illustrating typical media programming 200 processing 310 for playing 320 as an HLS stream, resulting in T_STARTUP_0 330.

Implementations of the technology process (e.g., identify, retrieve, segment and manifest if necessary, and deliver with manifest) and play the HLS pre-roll ad while the remaining content and ads are processed. This approach can be especially useful in at least those situations where both 1) the pre-roll ad can be processed, and play of the pre-roll ad can be started, in less time than the entire content and all the ads can be processed, and 2) the remaining content and ads can be processed before the end of play of the pre-roll ad. The technology provides utility even where 2) is not met, when the delay between the end of the pre-roll and the beginning of play of the remaining content and ads is tolerably short.

Figure 4:
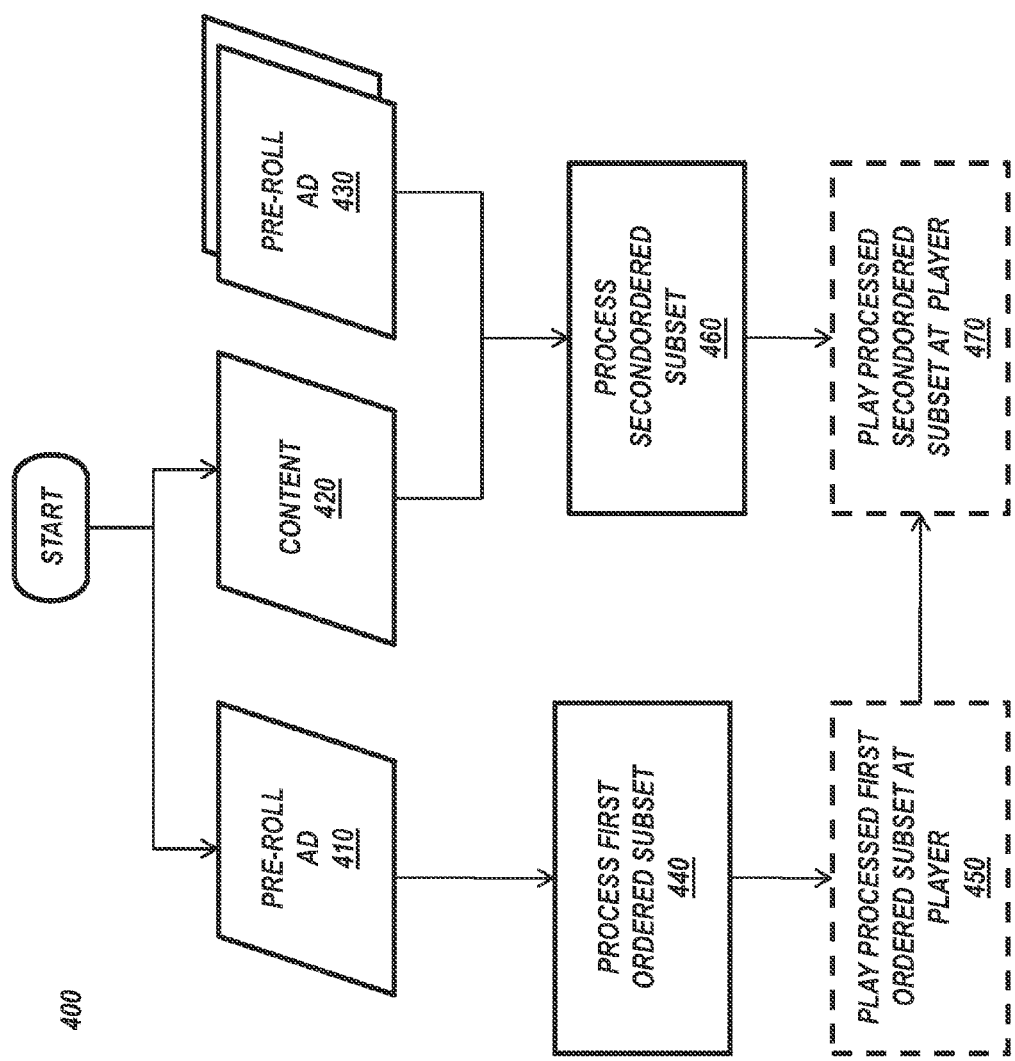
FIG. 4 illustrates methods of the present technology.
Figure 5:
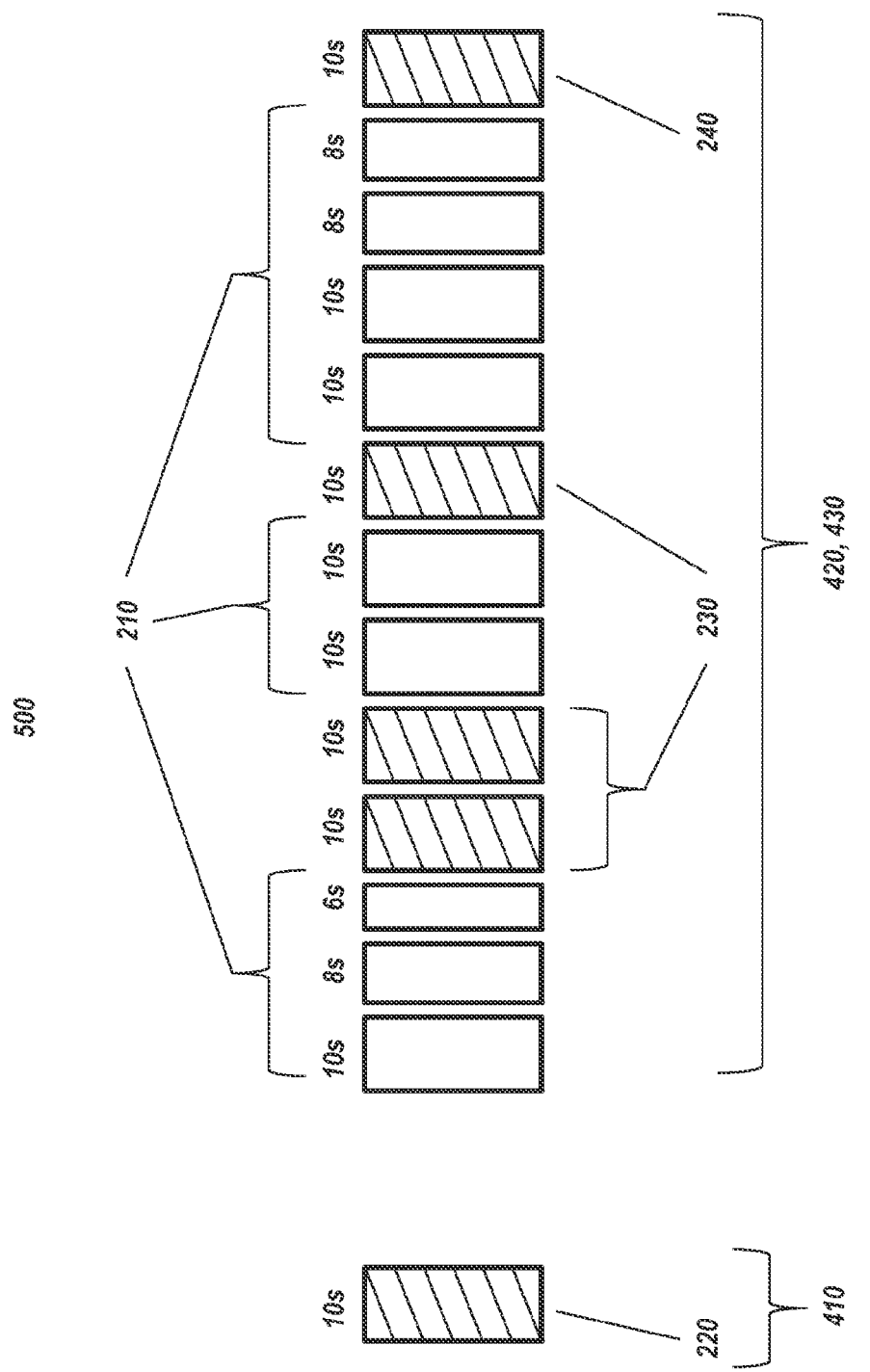
FIG. 5 illustrates an HLS stream of the present technology.

FIG. 4 illustrates methods 400 for processing an ordered sequence of frames of a media program intended for play in a device operative to play the program from an HLS stream, and where a first ordered subset of frames is a pre-roll ad 410, and a second ordered subset of frames includes content 420 and the remaining ads 430 of the media program. In such methods, the first ordered subset is processed independently 440 from processing the second ordered subset 460. In some embodiments, processing the first ordered subset, e.g., pre-roll ad 410 not in HLS format, can include segmenting the subset and creating a manifest file. In other embodiments, non-HLS pre-roll ads can be played directly by the destination player without re-formatting in to HLS form. Playing the pre-roll ad 450 can provide sufficient time to process the content and remaining ads. At some time no later than the end of play of the first ordered subset, the second ordered subset of frames of the media program can be processed. In cases such as those illustrated in FIG. 4, the content 420 and remaining ads 430 are processed 460 as the second subset in HLS format. At the end of play of the processed first ordered subset 450, the processed second ordered subset can be played 470. FIG. 5 illustrates how the pre-roll ad 220 can be the first subset, and the content 210 and remaining ads 230, 240 can be the second subset. Dividing the stream as shown in FIG. 5 can result in two manifest files (where both the first and second subsets are in HLS format) as follows:

```
#EXTM3U
#EXT-X-MEDIA-SEQUENCE:0
#EXT-X-TARGETDURATION:10
#AD-BEGIN
#EXTINF:10,
http://streaming.adserver0.com/chunk1.ts
#AD-END
#EXT-X-ENDLIST
#EXTM3U
#EXT-X-MEDIA-SEQUENCE:0
#EXT-X-TARGETDURATION:10
#EXTINF:10,
http://streaming.contentserver.com/chapter1_chunk1.ts
#EXTINF:8,
http://streaming.contentserver.com/chapter1_chunk2.ts
#EXTINF:6,
http://streaming.contentserver.com/chapter1_chunk3.ts
#AD-BEGIN
#EXTINF:10,
http://streaming.adserver1.com/chunk1.ts
#EXTINF:10,
http://streaming.adserver1.com/chunk2.ts
#AD-END
#EXTINF:10,
http://streaming.contentserver.com/chapter2_chunk1.ts
#EXTINF:10,
http://streaming.contentserver.com/chapter2_chunk2.ts
#AD-BEGIN
#EXTINF:10,
http://streaming.adserver2.com/chunk1.ts
#AD-END
```

-continued

```
#EXTINF:10,
http://streaming.contentserver.com/chapter3_chunk1.ts
#EXTINF:10,
http://streaming.contentserver.com/chapter3_chunk2.ts
#EXTINF:8,
http://streaming.contentserver.com/chapter3_chunk3.ts
#EXTINF:8,
http://streaming.contentserver.com/chapter3_chunk4.ts
#AD-BEGIN
#EXTINF:10,
http://streaming.adserver3.com/chunk1.ts
#EXT-X-ENDLIST
```

Figure 6:
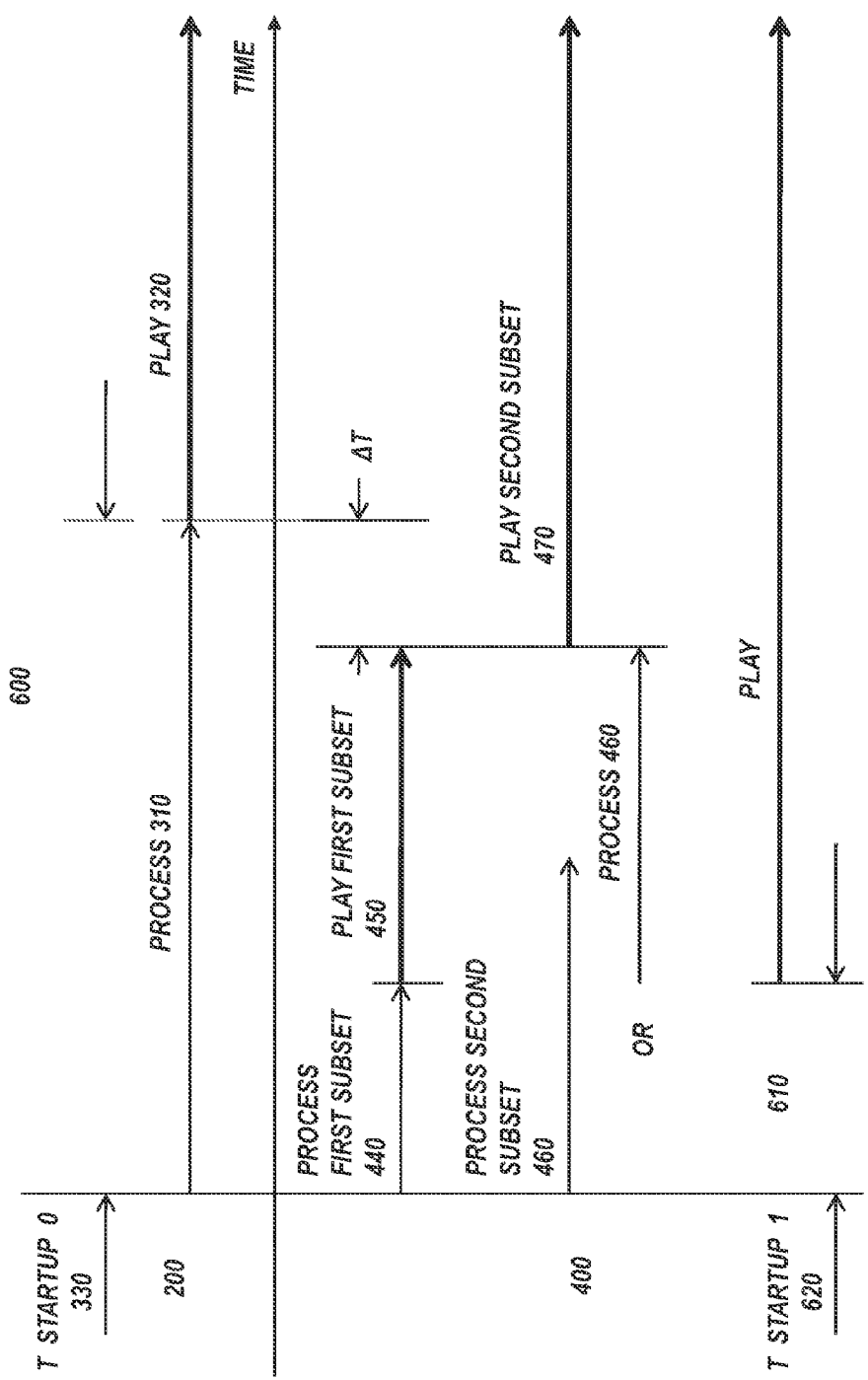
FIG. 6 illustrates a comparison of notional timelines for a typical HLS media program and a media program of the present technology.

FIG. 6 illustrates a notional timeline comparing typical media programming 200 processing 310 for playing 320 as an HLS stream to notional timelines for processing a stream 500 of the present technology. As with FIG. 3, the time for processing 310 the entire stream 200 can be so long that some viewers are lost. In implementations of the present technology, the time to process the second subset 460 is less than the time for processing 440 and playing 450 the first subset. Note that the second subset can begin processing 460 at T=0 or as late as a time that allows the second subset to be processed 460 no later than the first subset finishing play 450. The second subset can then be played 470 at the end of playing the first subset 450, resulting in substantially continuous play 610 with startup latency T_STARTUP_1 620 <T_STARTUP_0 330.

In some implementations, the technology assesses the ads included in the media program. If there is a pre-roll ad, and the technology determines that separately processing the pre-roll ad will improve the viewer experience, then the technology performs the functions described herein using the pre-roll ad as the first subset of frames. The technology can determine that separately processing the pre-roll ad will improve the viewer experience in a variety of ways. For example, the technology can count the total number of ads to be manifested into a single manifest; if more than a threshold of ads is to be manifested into a single manifest, then the technology can divide the frames of the media program into at least two manifest files, e.g., the first manifest file including the pre-roll ad. The threshold can be programmable, including settable in real time (e.g., as a function of the quality and bandwidth of the communications link), determined by a profile (e.g., of the user, of the content, the playing device, the quality of the communications link). For example, if the media program includes a pre-roll ad, and the total number of ads is greater than five (5), then the technology disclosed herein can be employed.

Assessing ads can include estimating or determining the processing time associated with a single-manifest versus multiple manifest approaches. Again, a threshold can be used. Also, the time for processing single versus multiple manifest files can be compared to determine whether the viewing experience is improved by single-manifest versus multiple-manifest approaches. Note that the viewing experience can be considered "improved" even if the total latency of the multiple manifest approach is equal to or greater than the total latency of the single manifest approach. For example, while a single manifest approach might result in six (6) seconds of latency, and the corresponding double manifest approach results in three (3) seconds of initial latency and then four (4) second of latency from the pre-roll ad to the content, this can be considered a better viewing experience if the criteria is that no latency be greater than four (4) seconds, even though the overall latency of the multiple manifest approach is seven (7) seconds versus six (6) seconds for the single manifest approach.

The invention claimed is:

1. A computer-implemented method for processing an ordered sequence of frames of a media program, the media program for play in a media playing device operative to play the program from a streaming format, the method comprising:
segmenting a first ordered subset of frames of the ordered sequence into a plurality of segments;
creating a first manifest file based on the first ordered subset of frames, the manifest file comprising pointers to the plurality of segments;
responsive to receiving a request from the media playing device, transmitting the first manifest file to the media playing device;
concurrently to at least one of creating the first manifest file and the media playing device playing the first ordered subset of frames, converting a second ordered subset of frames of the ordered sequence into a streaming format, wherein a playing time of the first ordered subset of frames on the media playing device is at least equal to a converting time to convert the second ordered subset of frames to the streaming format;
creating a second manifest file based on the converted second ordered subset of frames; and
transmitting the second manifest file to the media playing device, wherein the media playing device plays the converted second ordered subset of frames based on the second manifest file after playing the first ordered subset of frames.

2. The method of claim 1, wherein:
the media program comprises: at least one pre-roll ad and content;
the first ordered subset comprises a subset of the at least one pre-roll ad; and
the second ordered subset comprises a subset of the content.

3. The method of claim 1, wherein:
the media playing device comprises an HLS player.

4. The method of claim 1, wherein:
the first ordered subset is in a format other than an HLS format, and
segmenting the first ordered subset further comprises formatting the first ordered subset into the HLS format.

5. A non-transitory computer readable storage medium storing instructions executable by a processor, the instructions for processing an ordered sequence of frames of a media program, the media program formatted at least in part in a streaming format, the instructions when executed by the processor causing the processor to:
segment a first ordered subset of frames of the ordered sequence into a plurality of segments;
create a first manifest file based on the first ordered subset of frames, the manifest file comprising pointers to the plurality of segments;
responsive to receiving a request from the media playing device, transmitting the first manifest file to the media playing device;
concurrently to at least one of creating the first manifest file and the media playing device playing the first ordered subset of frames, converting a second ordered subset of frames of the ordered sequence into the streaming format, wherein a playing time of the first ordered subset of frames on the media playing device is at least equal to a converting time to convert the second ordered subset of frames to the streaming format;
creating a second manifest file based on the converted second ordered subset of frames; and
transmitting the second manifest file to the media playing device, wherein the media playing device plays the converted second ordered subset of frames based on the second manifest file after playing the first ordered subset of frames.

6. The computer program product of claim 5, wherein:
the media program comprises: at least one pre-roll ad and content;
the first ordered subset comprises a subset of the at least one pre-roll ad; and
the second ordered subset comprises a subset of the content.

7. The computer program product of claim 5, wherein:
the media playing device comprises an HLS player.

8. The computer program product of claim 5, wherein:
the first ordered subset is in a format other than an HLS format, and
segmenting the first ordered subset further comprises formatting the first ordered subset into the HLS format.

9. A system for processing an ordered sequence of frames of a media program, the media program formatted at least in part in a streaming format, the system comprising:
a processor, and
a non-transitory computer-readable storage medium storing instructions that when executed by the processor cause the processor to:
segment a first ordered subset of frames of the ordered sequence into a plurality of segments;
creating a first manifest file based on the first ordered subset of frames, the manifest file comprising pointers to the plurality of segments;
responsive to receiving a request from the media playing device, transmitting the first manifest file to the media playing device;
concurrently to at least one of creating the first manifest file and the media playing device playing the first ordered subset of frames, converting a second ordered subset of frames of the ordered sequence into a streaming format, wherein a playing time of the first ordered subset of frames on the media playing device is at least equal to a converting time to convert the second ordered subset of frames to the streaming format;
creating a second manifest file based on the converted second ordered subset of frames; and
transmitting the second manifest file to the media playing device, wherein the media playing device plays the converted second ordered subset of frames based on the second manifest file after playing the first ordered subset of frames.

10. The system of claim 9, wherein:
the media program comprises: at least one pre-roll ad and content;
the first ordered subset comprises a subset of the at least one pre-roll ad; and
the second ordered subset comprises a subset of the content.

11. The system of claim 9, wherein:
the media playing device comprises an HLS player.

12. The system of claim 9, wherein:
the first ordered subset is in a format other than an HLS format, and segmenting the first ordered subset further comprises formatting the first ordered subset into the HLS format.

13. A computer-implemented method for processing an ordered sequence of frames of a media program, the media program comprising content and at least one pre-roll ad, the media program for play in a media playing device operative to play the program from a streaming format, the method comprising:
- determining whether to process the media program using a single manifest approach or a multiple manifest approach, the single manifest approach utilizing a single manifest file for the media program and the multiple manifest approach using two or more manifest files for the media program, the determining based on estimated latencies associated with each of the single manifest approach and the multiple manifest approach;
- responsive to the determining to process the media program using the multiple manifest approach:
  - segmenting a first ordered subset of frames of the ordered sequence into a plurality of segments;
  - creating a manifest file based on the first ordered subset of frames, the manifest file comprising pointers to the plurality of segments;
  - responsive to receiving a request from a media playing device, transmitting the first manifest file to the media playing device;
  - concurrently to creating the first manifest file and the media player playing the first ordered subset of frames, converting a second ordered subset of frames of the ordered sequence into a streaming format, wherein the playing time of the first ordered subset of frames on the media player is at least equal to a converting time to convert the second ordered subset of frames;
  - creating a second manifest file based on the converted second ordered subset of frames; and
  - responsive to the request from the media playing device, transmitting the second manifest file to the media playing device that received the first manifest file, wherein the media playing device plays the converted ordered subset of frames on the media player after playing the first ordered subset of frames.

14. The method of claim 13, wherein determining whether to process the media program using the single manifest approach or the multiple manifest approach comprises:
- estimating the startup latency associated with the single manifest approach;
- estimating the startup latency associated with the multiple manifest approach;
- estimating the total latency associated with the single manifest approach, and
- estimating the total latency associated with the multiple manifest approach.

15. The method of claim 14, wherein determining whether to process the media program using the single manifest approach or the multiple manifest approach further comprises:
- processing the media program using the multiple manifest approach responsive to the startup latency for the single manifest approach being less than the startup latency for the multiple manifest approach, and the single manifest total latency being greater than the multiple manifest total latency plus a threshold latency.

* * * * *